June 6, 1967  V. L. MOORE  3,324,398
DUAL CHANNEL COINCIDENCE CIRCUIT
Filed Jan. 11, 1965  2 Sheets-Sheet 1

INVENTOR
V. L. MOORE

BY Young & Quigg

ATTORNEYS

June 6, 1967 V. L. MOORE 3,324,398
DUAL CHANNEL COINCIDENCE CIRCUIT
Filed Jan. 11, 1965 2 Sheets-Sheet 2

INVENTOR
V. L. MOORE
BY
*Young & Quigg*
ATTORNEYS

United States Patent Office

3,324,398
Patented June 6, 1967

3,324,398
DUAL CHANNEL COINCIDENCE CIRCUIT
Vernon L. Moore, Bartlesville, Okla., assignor to Phillips Petroleum Company, a corporation of Delaware
Filed Jan. 11, 1965, Ser. No. 424,691
6 Claims. (Cl. 328—94)

This invention relates to method and apparatus for detecting simultaneous occurrences of events. In one aspect the invention relates to a novel and improved dual channel coincidence circuit.

Some of the difficulties encountered with conventional coincidence circuits are the criticality in adjustment of circuit parameters and the stability of the circuit over a reasonable period of time. In fact many of the coincidence circuits have had to be recalibrated hourly. Accordingly it has become desirable to provide a novel coincidence circuit which exhibits stability over a long period of time and which is less critical in adjustment. In accordance with the invention there is provided a transistorized coincidence circuit having at least two channels, each of said channels comprising means for converting the input pulses to square waves, a differentiating circuit to provide the positive and negative differential pulse for each square wave, means for clipping the differential pulse of unwanted plurality, a trigger circuit, means for applying each remaining differential pulse to an input of the trigger circuit, and means for applying the output of the trigger circuit of each of the channels to a respective one of the inputs of an "and" circuit. The output of the "and" circuit can be amplified and recorded or passed to further processing equipment as desired.

Accordingly it is an object of the invention to provide new and improved coincidence circuits. Another object of the invention is to provide a novel and improved method for detecting a simultaneous occurrence of a plurality of events. Another object of the invention is to provide a coincidence circuit which is stable over a long period of time. A further object of the invention is to provide a novel coincidence circuit, the elements of which are not critical in their adjustment. Another object of the invention is to provide a coincidence circuit having a resolving time of one microsecond. Yet another object of the invention is to provide a coincidence circuit wherein each channel comprises identical components, thereby reducing the cost and minimizing undesirable variations in the output.

Other aspects, objects and advantages of the invention will be apparent from a study of the specification, the drawings and the appended claims to the invention.

Figure 1:
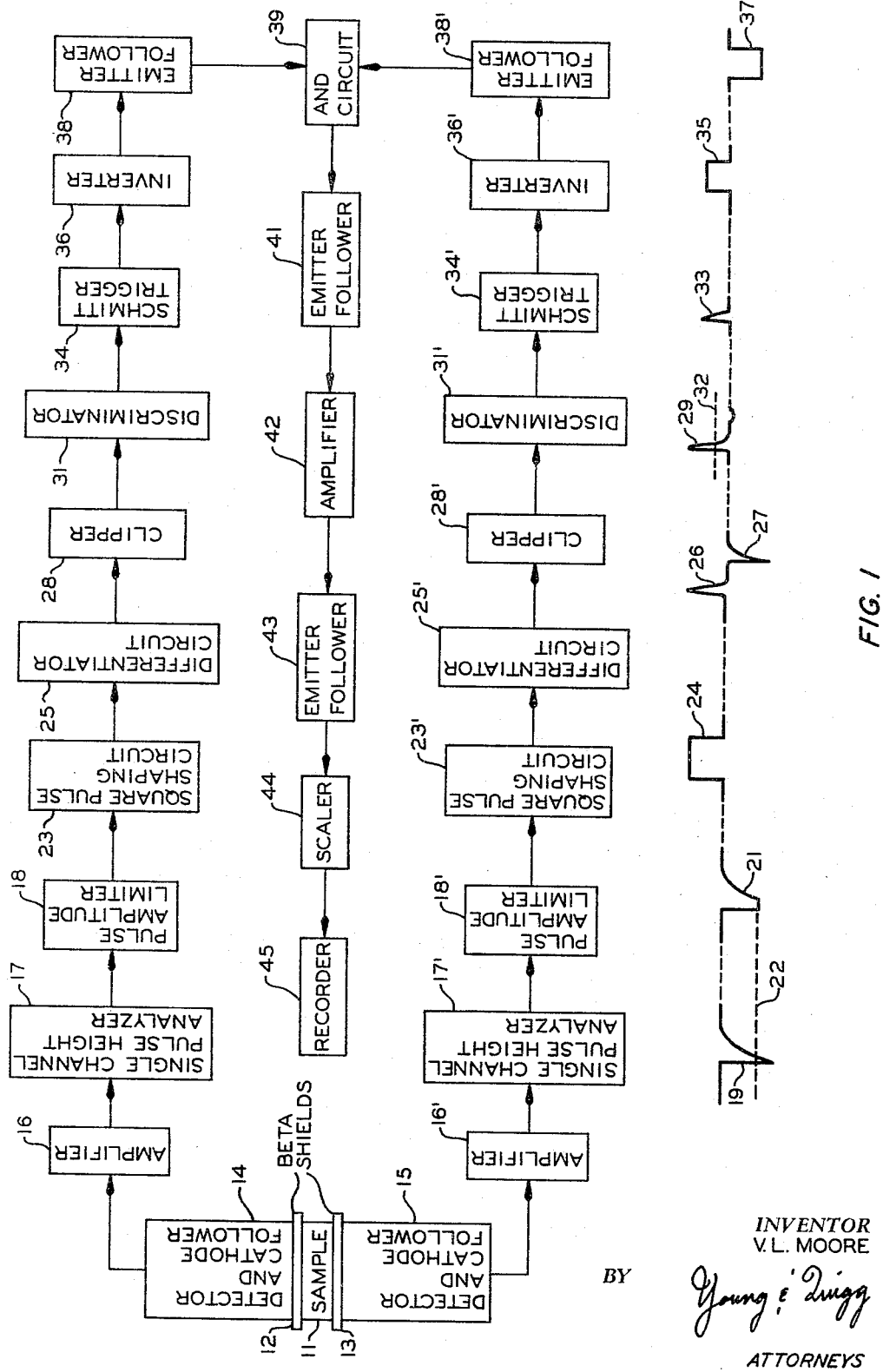
Figure 2:
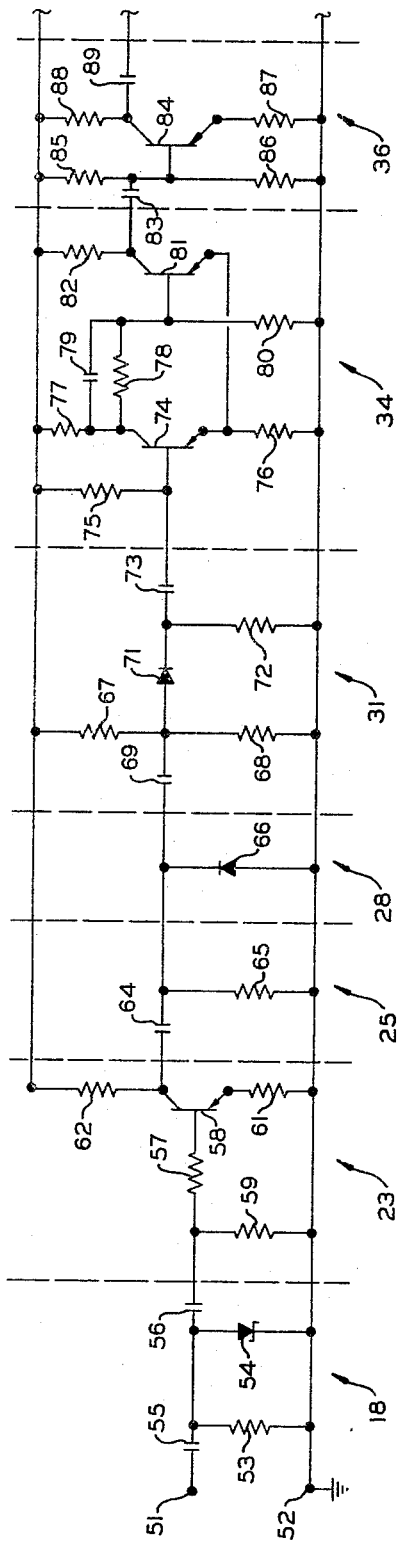
Figure 2:
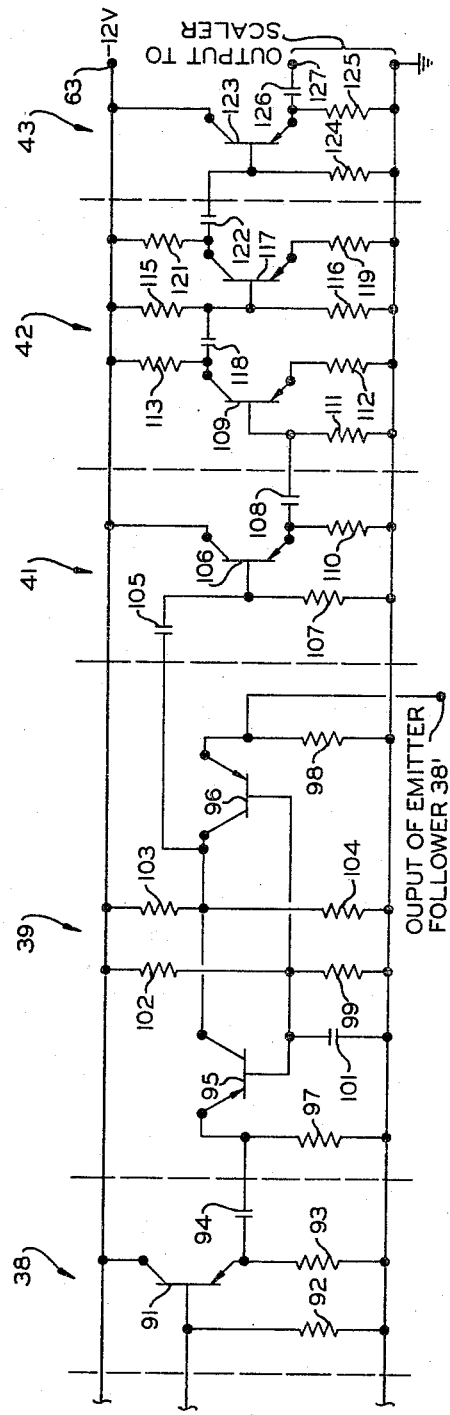

In the drawings FIGURE 1 is a diagrammatic illustration of a dual channel coincidence circuit in accordance with the invention, and FIGURE 2 is a schematic representation of the circuit arrangement of an individual channel of a coincidence circuit in accordance with one embodiment of the invention.

Referring now to the drawing in detail and in particular to FIGURE 1, the sample 11 to be analyzed is placed between beta particle shields 12 and 13. Suitable radiation detectors 14 and 15 are located on the side of the beta particle shields opposite the sample. These radiation detectors can be any suitable devices, for example a scintillation crystal, photoelectric multiplier and cathode follower. The output of detector 14 is amplified by amplifier 16 and applied to the input of single-channel pulse analyzer 17. The output of analyzer 17 representing the range of pulse heights of interest is applied to the input of pulse amplitude limiter 18. The function of limiter 18 is to provide a constant amplitude pulse input to the remainder of the coincidence circuit and to eliminate overloading due to occurrences of unexpectedly high amplitude signals in the output of analyzer 17. An exemplary output signal of analyzer 17 is illustrated by pulse 19 while the corresponding output of limiter 18 is represented by clipped pulse 21. The maximum amplitude passed by limiter 18 is represented by the dotted line 22. Clipped pulses 21 are applied to square pulse shaping circuit 23 which produces a rectangular wave 24 corresponding to each of the input signals. The square waves are applied to the input of differentiator circuit 25 which produces a positive peak 26 corresponding to the leading edge of a pulse 24 and a negative peak 27 corresponding to the trailing edge of pulse 24. The differential output pulses 26 and 27 are applied to input of clipper 28 which passes only those of the desired plurality, here the positive pulse 29 corresponding to pulse 26.

In order to minimize erroneous signals caused by the presence of noise, the output of clipper 28 is applied to an input of discriminator 31 which produces an output signal only when the input signal is above a predetermined value. Another name for discriminator 31 is a threshold circuit. The threshold or discrimination level of discriminator 31 is represented by the dotted line 32 on pulse 29 and the corresponding output of discriminator 31 is represented by pulse 33. The substantially noise free output of discriminator 31 is applied to an input of a trigger circuit such as Schmitt trigger 34. The Schmitt trigger produces a rectangular output pulse of constant amplitude and constant width for each input pulse applied to the trigger circuit. The width of the output pulses from the Schmitt trigger are relatively long compared to the duration of the input pulse to permit coincidence of pulses from separate channels despite small time displacements. The output of trigger circuit 34 is represented by pulse 35. The output of trigger circuit 34 is passed through inverter 36 to provide on output signal 37 corresponding to a reversed polarity image of the signal represented by pulse 35. Emitter follower 38 is utilized to provide impedance matching between inverter 36 and an input of "and" circuit 39.

The output of detector 15 is applied to a second channel identical to the first channel and the corresponding components are identified by corresponding primed numerals. The output of emitter follower 38' is applied to a second input of "and" circuit 39. Circuit 39 produces an output signal only when there is a signal applied to each of its inputs, thus representing a simultaneous occurrence of two events. The output of "and" circuit 39 is applied through emitter follower 41 to an amplifier 42. The amplified signal is applied through emitter follower 43 to a scaler 44 or to other processing means as desired. The output of scaler 44 can be recorded by means of recorder 45.

Referring now to FIGURE 2, there is presented a circuit diagram for the components of one channel beginning with pulse limiter 18 and including the common components of "and" circuit 39 through emitter follower 43. The output of the single-channel pulse height analyzer 17 is applied between terminals 51 and 52, the latter being grounded. A resistor 53 and a Zener diode 54 are connected in parallel between terminal 52 and the second terminal of a D.C. isolation capacitor 55, the first terminal of capacitor 55 being connected to terminal 55. Zener diode 54 is selected to provide a maximum limit to the amplitude of the pulses passed through limiting circuit 18. Pulses which exceed this selected value cause Zener diode 54 to conduct, thereby clipping the excess amplitude. A D.C. isolation capacitor 56 and a resistor 57 are connected in series between the second terminal capacitor 55 and the base of transistor 58. A resistor 59 is connected between ground and the junction between capacitor 56 and the resistor 57. The emitter of transistor 58 is connected through resistor 61 to ground while the collector of transistor 58 is connected through resistor 62 to the output terminal 63 of a suitable source of negative potential, for example −12 volts. The application of an input pulse to the base of transistor 58 drives the transistor from cut off to saturation, thereby producing a square output pulse for each input pulse. The differentiator circuit 25 comprises a capacitor 64 and a resistor 65 connected in series between the collector of transistor 58 and ground. The voltage appearing at the junction between capacitor 64 and resistor 65 is represented by pulses 26 and 27 (FIGURE 1). Clipping circuit 28 comprises a rectifier 66 connected between ground and the junction between capacitor 64 and resistor 65. Thus rectifier 66 provides a short circuit to ground for negative peaks while having no effect upon the positive peaks.

Resistors 67 and 68 are connected in series between terminal 63 and ground, and the junction between resistors 67 and 68 is connected through a D.C. isolation capacitor 69 to the cathode of rectifier 66. A rectifier 71 and a resistor 72 are connected in series between ground and the junction between resistors 67 and 68. The values of resistors 67 and 68 are selected to provide a negative bias on the anode of rectifier 71. Thus the voltage which appears at the cathode of rectifier 71 is represented by pulse 33 (FIGURE 1) and corresponds to only that portion of the input signal which exceeds the threshold level established by the bias voltage. The cathode of rectifier 71 is connected through a D.C. isolation capacitor 73 to the base of transistor 74. The base of transistor 74 is also connected through resistor 75 to negative potential terminal 63. The emitter of transistor 74 is connected through resistor 76 to ground while the collector is connected through resistor 77 to negative potential terminal 63. A resistor 78 and a capacitor 79 are connected in parallel between the collector of transistor 74 and the base of transistor 81, the latter also being connected to ground through resistor 80. The collector of transistor 81 is connected through resistor 82 to negative potential terminal 63. The emitter of transistors 74 and 81 are connected to each other.

The output of the Schmitt trigger 34, while appears at the collector of transistor 81, is applied through a D.C. isolation capacitor 83 to the base of transistor 84. The base of transistor 84 is connected through resistor 85 to negative potential terminal 63 and through resistor 86 to ground. The values of resistors 85 and 86 are selected to provide the desired bias on the base of transistor 84. The emitter of transistor 84 is connected to ground by way of resistor 87 while the collector is connected through resistor 88 to negative potential terminal 63. A capacitor 89 is connected between the collector of transistor 84 and the base of transistor 91, the latter also being connected to ground through resistor 92. The emitter of transistor 91 is connected to ground by way of resistor 93 while the collector is connected directly to the negative potential terminal 63. The output of emitter follower 38 is applied to an input of "and" circuit 39 by a D.C. isolation capacitor 94 which is connected between the emitter of transistor 91 and the emitter of transistor 95. The output of emitter follower 38' is applied to the emitter of transistor 96. The emitters of transistors 95 and 96 are connected to ground through resistors 97 and 98, respectively. A resistor 99 and a capacitor 101 are connected in parallel between ground and each of the bases of transistors 95 and 96. A resistor 102 is connected between negative potential terminal 63 and the bases of each of transistors 95 and 96 to form a voltage divider biasing network with resistor 99. The collector of transistors 95 and 96 are connected to each other and through resistor 103 to negative potential terminal 63. The collector of transistors 95 and 96 are also connected through resistor 104 to ground.

A D.C. isolation capacitor 105 is connected between the collectors of transistors 95 and 96 and the base of transistor 106, the latter being connected to ground through resistor 107. The collector of transistor 106 is connected directly to negative potential terminal 63 while the emitter is connected through resistor 110 to ground. A D.C. isolation capacitor 108 is connected between the emitter of transistor 106 and the base of transistor 109, the latter also being connected to ground through resistor 111. The emitter of transistor 109 is connected to ground by way of resistor 112 while the collector is connected to terminal 63 by way of resistor 113. Resistors 115 and 116 are connected in series between terminal 63 and ground, with the junction between resistors 115 and 116 being connected to the base of transistor 117 and through capacitor 118 to the collector of transistor 109. The emitter of transistor 117 is connected through resistor 119 to ground while the collector is connected by way of resistor 121 to terminal 63. Transistors 109 and 117 thus form a two-stage amplifier. The collector of transistor 117 is connected through a D.C. isolation capacitor 122 to the base of a transistor 123, the latter also being connected to ground by way of resistor 124. The collector of transistor 123 is connected directly to terminal 63 while the emitter is connected through resistor 125 to ground. A D.C. isolation capacitor 126 is connected between the emitter of transistor 123 and the output terminal 127. The input to scaler 44 is the voltage between terminal 127 and ground.

The following specific values of components of the circuit are presented in further illustration of the invention and should not be construed to unduly limit the invention.

| Component.—Resistors: | Description Resistance, ohms |
|---|---|
| 57, 62, 82, 88, 92, 99, 111, 121 | 1,000 |
| 72 | 10,000 |
| 107, 110 | 2,000 |
| 59 | 2,700 |
| 53 | 180,000 |
| 61 | 110 |
| 65 | 5,100 |
| 68 | 100,000 |
| 76 | 100 |
| 80, 102 | 5,600 |
| 86, 116 | 3,600 |
| 87 | 43 |
| 93, 125, 113 | 2,200 |
| 97, 98 | 240 |
| 104 | 8,200 |
| 112, 119 | 47 |
| 124 | 7,500 |
| 67 | 1,100,000 |
| 75 | 160,000 |
| 77 | 2,400 |
| 78, 85, 115 | 18,000 |
| 103 | 1,800 |

| Capacitors: | | Capacitance |
|---|---|---|
| 55, 94, 105, 126 | mf | .01 |
| 56 | mf | .02 |
| 64, 73, 79 | mmf | 100 |
| 69 | mmf | 1000 |
| 83 | mmf | 200 |
| 89 | mf | .005 |
| 101 | mf | 2 |
| 108 | mmf | 250 |
| 118 | mmf | 620 |
| 122 | mmf | 910 |

| Zener diode 54 | IN751 |
|---|---|

| Transistors: | |
|---|---|
| 58, 84, 91, 106, 109 | 2N2188 |
| 74, 81, 95, 96, 117 | 2N2190 |
| 123 | 2N404A |

The coincidence circuit in accordance with the invention provides a resolving time of less than one microsecond and can be operated for a period of time longer than a month without requiring recalibration. Some of the units built in accordance with the invention have been operating for as long as six months without requiring recalibration and have remained reliable without requiring maintenance work.

While the invention has been illustrated in terms of dual channel coincidence circuits, it is within the contemplation of the invention to utilize three or more channels to provide the desired level of coincidence. By providing multiple channels with each of the channels having identical component arrangement, the resulting coincidence circuit is balanced and encounters a minimum number of variations due to extraneous excitations.

I claim:

1. A coincidence circuit comprising first and second channels and an "and" circuit having first and second inputs; each of said channels comprising means for producing a square wave pulse for each input pulse applied thereto, means for differentiating each of the thus produced square wave pulses to produce a positive differentiated pulse and a negative differentiated pulse corresponding to each of said square wave pulses, clipping means for producing an output pulse corresponding to each of the differentiated pulses having a particular polarity, a trigger circuit to produce a constant amplitude output pulse of relatively long duration compared to the duration of the input pulse applied thereto, means for applying the output of said clipping means to the input of said trigger circuit, and means for applying the output of said trigger circuit to a respective one of said first and second inputs of said "and" circuit.

2. A coincidence circuit comprising first and second channels, each of said channels comprising pulse amplitude limiting means for passing an input signal applied thereto up to a maximum value and passing only said maximum value when said input signal exceeds said maximum value, transistorized pulse shaping means for producing a rectangular pulse corresponding to the occurrence of each input pulse applied thereto, means for connecting the output of said pulse amplitude limiting means to the input of said pulse shaping means, a differentiating circuit to produce a positive output pulse and a negative output pulse for each rectangular pulse applied to the input thereof, means for connecting the output of said pulse shaping means to the input of said differentiating circuit, clipping means for passing only pulses of a particular polarity, means for connecting the output of said differentiating circuit to the input of said clipping means, a discriminating means for passing a signal only when such signal exceeds a threshold value, means for connecting the output of said clipping means to the input of said discriminating means, a transistorized trigger circuit to produce a rectangular output pulse of constant height and constant width for each input signal applied thereto, means connecting the output of said discriminating means to the input of said trigger circuit, a transistorized inverting means for producing an output signal which is a reverse polarity image of the input signal applied thereto, means for connecting the output of said trigger circuit to the input of said inverting means, an emitter follower, and means connecting the output of said inverting means to the input of said emitter follower; a transistorized "and" circuit having first and second inputs; means connecting the output of the emitter follower of said first channel to said first input of said "and" circuit; means connecting the output of the emitter follower of said second channel to said second input of said "and " circuit; a third emitter follower having its input connected to the output of said "and" circuit; a transistorized amplifier having its input connected to the output of said third emitter follower; a fourth emitter follower having its input connected to the output of said amplifier; and indicating means connected to the output of said fourth emitter follower.

3. A coincidence circuit comprising a plurality of channels, each of said channels comprising pulse amplitude limiting means for passing an input signal applied thereto up to a maximum value and passing only said maximum value when said input signal exceeds said maximum value, pulse shaping means for producing a rectangular pulse corresponding to the occurrence of each input pulse applied thereto, means for connecting the output of said pulse amplitude limiting means to the input of said pulse shaping means, a differentiating circuit to produce a positive output pulse and a negative output pulse for each rectangular pulse applied to the input thereof, means for connecting the output of said pulse shaping means to the input of said differentiating circuit, clipping means for passing only pulses of a particular polarity, means for connecting the output of said differentiating circuit to the input of said clipping means, a discriminating means for passing a signal only when such signal exceeds a threshold value, means for connecting the output of said clipping means to the input of said discriminating means, a trigger circuit to produce a rectangular output pulse of constant height and constant width for each input signal applied thereto, means connecting the output of said discriminating means to the input of said trigger circuit, inverting means for producing an output signal which is a reverse polarity image of the input signal applied thereto, means for connecting the output of said trigger circuit to the input of said inverting means, an emitter follower, and means connecting the output of said inverting means to the input of said emitter follower; an "and" circuit having a plurality of inputs corresponding in number to the number of said channels; means connecting the output of the emitter follower of each channel to a respective input of said "and" circuit; an amplifier; an emitter follower connected between the output of said "and" circuit and the input of said amplifier; indicating means; and an emitter follower connected between the output of said amplifier and the input of said indicating means.

4. A coincidence circuit comprising first and second channels, each of said channels comprising pulse amplitude limiting means for passing an input signal applied thereto up to a maximum value and passing only said maximum value when said input signal exceeds said maximum value, pulse shaping means for producing a rectangular pulse corresponding to the occurrence of each input pulse applied thereto, means for connecting the output of said pulse amplitude limiting means to the input of said pulse shaping means, a differentiating circuit to produce a positive output pulse and a negative output pulse for each rectangular pulse applied to the input thereof, means for connecting the output of said pulse shaping means to the input of said differentiating circuit, clipping means for passing only pulses of a particular polarity, means for connecting the output of said differentiating circuit to the input of said clipping means, a trigger circuit to produce a rectangular output pulse of constant height and constant width for each input signal applied thereto, and means connecting the output of said clipping means to the input of said trigger circuit; an "and" circuit having first and second inputs; means connecting the output of the trigger circuit of said first channel to said first input of said "and" circuit; means connecting the output of the trigger circuit of said second channel to said second input of said "and" circuit; and indicating means connected to the output of said "and" circuit.

5. A coincidence circuit comprising first and second channels, each of said channels comprising pulse shaping means for producing a rectangular pulse corresponding to the occurrence of each input pulse applied thereto, a differentiating circuit to produce a positive output pulse and a negative output pulse for each rectangular pulse applied to the input thereof, means for connecting the output of said pulse shaping means to the input of said differentiating circuit, clipping means for passing only pulses of a particular polarity, means for connecting the output of said differentiating circuit to the input of said clipping means, a trigger circuit to produce a rectangular output pulse of constant height and constant width for each input signal applied thereto, and means connecting the output of said clipping means to the input of said trigger circuit; an "and" circuit having first and second inputs; means connecting the output of the trigger circuit of said first channel to said first input of said "and" circuit; means connecting the output of the trigger circuit of said second channel to said second input of said "and" circuit; and indicating means connected to the output of said "and" circuit.

6. A coincidence circuit comprising first and second radiation detectors; a first amplifier connected to the output of said first radiation detector; a second amplifier connected to the output of said second radiation detector; first and second single-channel pulse height analyzers connected to the output of said first and second amplifiers respectively; first and second channels, each of said channels comprising pulse amplitude limiting means for passing an input signal applied thereto up to a maximum value and passing only said maximum value when said input signal exceeds said maximum value, means for connecting the output of a respective one of said first and second analyzers to the input of said pulse amplitude limiting means; pulse shaping means for producing a rectangular pulse corresponding to the occurrence of each input pulse applied thereto, means for connecting the output of said pulse amplitude limiting means to the input of said pulse shaping means, a differentiating circuit to produce a positive output pulse and a negative output pulse for each rectangular pulse applied to the input thereof, means for connecting the output of said pulse shaping means to the input of said differentiating circuit, clipping means for passing only pulses of a particular polarity, means for connecting the output of said differentiating circuit to the input of said clipping means, a discriminating means for passing a signal only when such signal exceeds a threshold value, means for connecting the output of said clipping means to the input of said discriminating means, a trigger circuit to produce a rectangular output pulse of constant height and constant width for each input signal applied thereto, means connecting the output of said discriminating means to the input of said trigger circuit, inverting means for producing an output signal which is a reverse polarity image of the input signal applied thereto, and means for connecting the output of said trigger circuit to the input of said inverting means, an emitter follower and means connecting the output of said inverting means to the input of said emitter follower; an "and" circuit having first and second inputs; means connecting the output of the emitter follower of said first channel to said first input of said "and" circuit; means connecting the output of the emitter follower of said second channel to said second input of said "and" circuit; a third emitter follower having its input connected to the output of said "and" circuit; a third amplifier having its input connected to the output of said third emitter follower; a fourth emitter follower having its input connected to the output of said third amplifier; and indicating means connected to the output of said fourth emitter follower.

No references cited.

ARTHUR GAUSS, *Primary Examiner.*

B. P. DAVIS, *Assistant Examiner.*